US010794287B2

(12) United States Patent
Giancotti et al.

(10) Patent No.: US 10,794,287 B2
(45) Date of Patent: Oct. 6, 2020

(54) MODULAR GAS TURBINE SYSTEM

(71) Applicant: Nuovo Pignone Tecnologie Srl, Florence (IT)

(72) Inventors: Marco Giancotti, Florence (IT); Andrea Righeschi, Florence (IT); Luciano Guidotti, Florence (IT); Michele Cecarini, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 117 days.

(21) Appl. No.: 16/077,333

(22) PCT Filed: Feb. 16, 2017

(86) PCT No.: PCT/EP2017/053496
§ 371 (c)(1),
(2) Date: Aug. 10, 2018

(87) PCT Pub. No.: WO2017/140777
PCT Pub. Date: Aug. 24, 2017

(65) Prior Publication Data
US 2019/0055887 A1    Feb. 21, 2019

(30) Foreign Application Priority Data
Feb. 18, 2016    (IT) .................. 102016000016891

(51) Int. Cl.
*F02C 7/143*    (2006.01)
*F02C 7/18*    (2006.01)
(Continued)

(52) U.S. Cl.
CPC ............ *F02C 7/143* (2013.01); *F01D 25/285* (2013.01); *F02C 7/18* (2013.01); *F25J 1/0278* (2013.01);
(Continued)

(58) Field of Classification Search
CPC .......... F01D 25/28; F01D 25/08; F01D 25/12; F01D 25/285; F05D 2230/68;
(Continued)

(56) References Cited

U.S. PATENT DOCUMENTS

| 5,758,485 A * | 6/1998 | Frutschi ............... F01D 25/007 415/179 |
| 2004/0016245 A1 | 1/2004 | Pierson |
| 2015/0184591 A1 * | 7/2015 | Giancotti ................. F02C 7/20 60/798 |

FOREIGN PATENT DOCUMENTS

| WO | 2014/028961 A1 | 2/2014 |
| WO | 2015/086464 A1 | 6/2015 |

OTHER PUBLICATIONS

Reale, M. J., "New High Efficiency Simple Cycle Gas Turbine—GE's LMS100™," GE Energy, pp. 1-17 (2004).
(Continued)

*Primary Examiner* — Richard A Edgar
(74) *Attorney, Agent, or Firm* — Baker Hughes Patent Org.

(57) ABSTRACT

A modular gas turbine system is disclosed. The system includes a base plate and a gas turbine engine mounted on the base plate. The gas turbine engine has a rotation axis, a first air compressor section and a second air compressor section. A rotating load is mechanically coupled to the gas turbine engine and mounted on the base plate. A supporting frame extends above the base plate and supports a plurality of secondary coolers, which are fluid exchange relationship with an intercooler of the gas turbine engine.

15 Claims, 5 Drawing Sheets

(51) Int. Cl.
  *F01D 25/28* (2006.01)
  *F25J 1/02* (2006.01)

(52) U.S. Cl.
  CPC ........... *F25J 1/0283* (2013.01); *F25J 1/0296* (2013.01); *F05D 2220/32* (2013.01); *F05D 2230/68* (2013.01); *F05D 2240/91* (2013.01); *F05D 2250/80* (2013.01); *F05D 2260/20* (2013.01); *F05D 2260/213* (2013.01); *F25J 2290/42* (2013.01)

(58) Field of Classification Search
  CPC ............ F05D 2250/80; F05D 2220/32; F05D 2260/20; F05D 2260/213; F05D 2240/91; F05D 2230/51; F05D 2260/98; F05D 2260/02; F02C 7/143; F02C 7/18; F02C 7/20; F25J 1/0278; F25J 1/0296; F25J 1/0283; F25J 2290/42; F25J 1/0022; F25J 1/0259; F16M 1/04
  See application file for complete search history.

(56) References Cited

OTHER PUBLICATIONS

Italian Search Report and Opinion issued in connection with corresponding IT Application No. 102016000016891 dated Nov. 3, 2016.
International Search Report and Written Opinion issued in connection with corresponding PCT Application No. PCT/EP2017/053496 dated Mar. 10, 2017.
International Preliminary Report on Patentability issued in connection with corresponding PCT Application No. PCT/EP2017/053496 dated Aug. 21, 2018.

* cited by examiner

MODULAR GAS TURBINE SYSTEM

TECHNICAL FIELD

The disclosure relates to gas turbine systems. Embodiments disclosed herein specifically concern gas turbine systems for mechanical drive applications. Some exemplary embodiments concern gas turbine systems for on-shore LNG plants, including one or more gas compressors driven by a gas turbine engine.

BACKGROUND OF THE INVENTION

Gas turbines are widely used as prime movers in power generation or industrial plants, for driving rotating loads, such as electric generators or turbomachines.

In off-shore installations, compressors driven by aero-derivative gas turbines having a power rate lower than 40 MW are often used, due to their compact structure and reduced overall dimensions. Modularization of gas turbines having a power rate lower than 40 MW is a quite common practice. The gas turbine and the load are arranged on a common frame, thus forming a single unit which is tested in the erection and testing yard or site prior to being transported to final destination. The common frame is then transported to final destination and mounted on a skid. A modular arrangement of this kind is particularly useful, since it allows complete assembling and testing of the rotary machines prior to shipping and installation to final destination.

Large gas turbines, both aero-derivative gas turbines as well as heavy duty gas turbines above 40 MW, are usually not modularized due to their large dimensions. Commonly, the various components of a gas turbine plant are transported separately from the site of manufacturing to the final destination. The foundation is prepared at the final site of destination and the individual machines are then mounted on the foundation. Due to the different radial dimensions of the various plant components, such as the gas turbine, the electric generator and the starter, the foundation is sometimes designed with machine-supporting surfaces at various different levels. The rotary machines must then be aligned, mechanically connected to one another and tuned. The entire process is extremely time-consuming.

US2015/0184591 discloses a modularized heavy-duty gas turbine engine for power generation, used for driving an electric generator.

Erection of the plant requires relatively long time, intervention of highly specialized staff, as well as the use of cumbersome machinery.

Some large gas turbine engines used in modular systems are equipped with an intercooler, which is arranged and configured for cooling partly compressed air from a first air compressor section of the gas turbine engine. The partly compressed and cooled air is then delivered to the suction side of a second air compressor section of the gas turbine engine. A heat removal fluid circulates in the intercooler, for removing heat from the partly compressed air. The heat removal fluid is in turn cooled through heat exchange with ambient air in secondary coolers.

These secondary coolers are usually arranged separately from the base plate which supports the gas turbine engine and increase the total footprint of the system.

A need therefore exists for more compact gas turbine engine systems, having a reduced footprint.

SUMMARY OF THE INVENTION

A modular gas turbine system is disclosed herein, comprising a base plate and a gas turbine engine mounted on the base plate. The modular gas turbine system is configured so that the module itself is transportable either by sea and by land. The gas turbine engine has a rotation axis, a first air compressor section and a second air compressor section and is drivingly coupled to a rotating load supported on the base plate. The system further comprises a supporting frame extending above the base plate, which supports a plurality of secondary coolers at a height above the base plate. The secondary coolers are in fluid exchange relationship with an intercooler which removes heat from partly compressed air delivered from a first air compressor section to a second air compressor section of the gas turbine engine. A heat removal fluid circulates in the intercooler and removes heat from the partly compressed air. Heat is in turn removed from the heat removal fluid by means of a cooling medium in the secondary coolers.

The secondary coolers can be air coolers, and the heat removal fluid is in heat exchange relationship with cooled ambient air in said secondary coolers.

The secondary coolers can be arranged on the supporting frame at a level above the gas turbine engine and/or the load.

The modular gas turbine system can further comprise lube oil coolers arranged on the supporting frame, at the same level as the secondary coolers.

According to some embodiments, the system can further comprise a first bridge crane and a second bridge crane, which are movably supported on the supporting frame, such as to move above the gas turbine engine and the load.

In some embodiments a third bridge crane can be movably supported on the supporting frame.

The bridge cranes can move on respective rails. In some embodiments a pair of rails is provided, whereon a first bridge crane and a second bridge crane can run. The third bridge crane can be movably arranged on a second pair of rails, in an embodiment, approximately orthogonal to the first pair of rails.

The modular gas turbine system described herein can be part of an on-shore LNG system for the liquefaction of natural gas. The rotating load driven by the gas turbine engine can comprises at least one gas compressor, configured for processing a refrigerant gas of the LNG system. A separate process module can be provided, whereon the components of the LNG system different from the refrigerant gas compressors, are arranged, such as the heat exchangers and the expanders.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of embodiments the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. Embodiments of the invention are capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of embodiments of the present invention. It is important, therefore, that the claims be regarded as including such equivalent constructions insofar as they do not depart from the spirit and scope of embodiments of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

The following detailed description of exemplary embodiments refers to the accompanying drawings. The same reference numbers in different drawings identify the same or similar elements. Additionally, the drawings are not necessarily drawn to scale. Also, the following detailed description does not limit embodiments of the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

According to embodiments disclosed herein, a modular gas turbine system 1 is provided, which comprises a base plate 3, whereon several instrumentalities and pieces of machinery are installed. The base plate 3 comprises a top surface 3T and a bottom surface 3B. The base plate 3 can be comprised of a lattice of longitudinal and transversal beams. In some embodiments, the structure of the base plate 3 can be configured as disclosed in US2015/0184591, the content whereof is incorporated herein by reference. The base plate 3 is anchored on a supporting structure 4, e.g. made of reinforced concrete.

On the top surface 3T of the base plate 3 a gas turbine engine 5 can be mounted. The gas turbine engine 5 can have a rated power of between about 40 MW and about 150 MW. Exemplary gas turbine engines 5 that can be used in systems according to the present disclosure can be, but are not limited to LM6000 and LMS100 aero-derivative gas turbines, or MS6001, MS7001 and MS9001 heavy duty gas turbines, all available from General Electric, USA.

Figure 3:
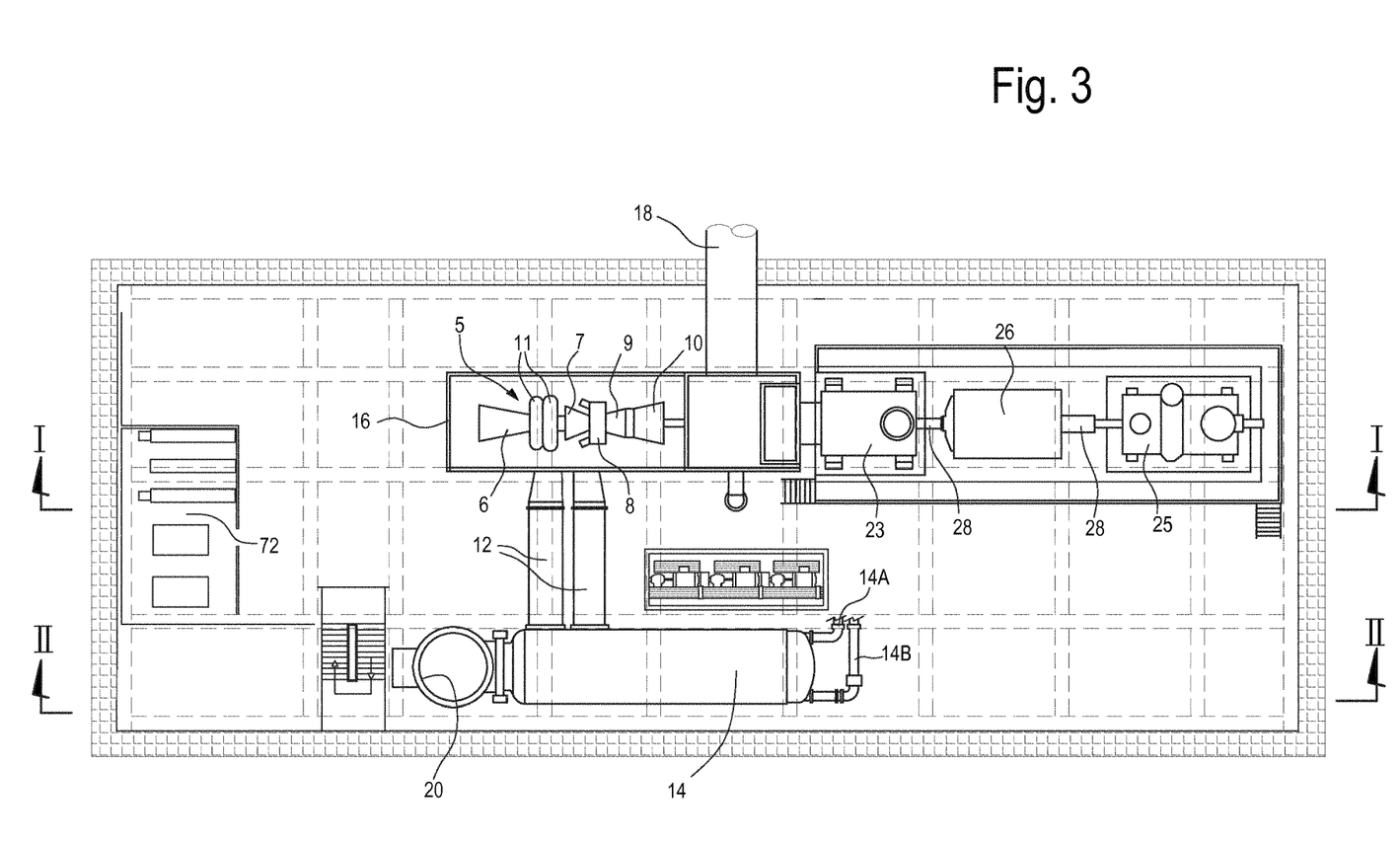
FIG. 3 illustrates a sectional view of the modularized gas turbine system according to line III-III of FIG. 1.

In the exemplary embodiment of FIG. 3, a configuration using an LMS100 aero-derivative gas turbine is shown. The gas turbine engine 5 can be comprised of a low pressure compressor section 6, a high pressure compressor section 7, a combustor section 8, a high pressure turbine section 9 and a low pressure turbine section 10. An intercooler 14 can be fluidly coupled to the delivery side of the low-pressure compressor section 6 and receive partly compressed air therefrom. Cooled, partly compressed air is returned from the intercooler to the high pressure compressor section 7. Reference number 11 (FIG. 3) schematically illustrate a fluid coupling to air intercooler air ducts 12, which connect the compressor sections 6 and 7 to intercooler 14. While in the exemplary embodiment disclosed herein the gas turbine engine 5 is an aero-derivative gas turbine engine, in other exemplary embodiments, not shown, a heavy-duty gas turbine can be used instead.

The gas turbine engine 5 and some of the auxiliaries thereof can be housed in a gas turbine enclosure 16.

The inlet of the compressor section 7 is in fluid communication with a clean air duct 13, extending between an air filter housing 15 and the gas turbine engine 5. In some embodiments, as shown in the attached drawings, the air filter housing 15 is mounted on the same base plate 3, which supports the gas turbine engine 5. In other embodiments, not shown, the air filter housing 15 can be mounted on a separate base plate or skid. However, installing the air filter housing 15 on the base plate 3 along with the gas turbine engine 5 can provide additional advantages, as will become apparent from the description herein below of a method of installing and commissioning the gas turbine system, as well as for maintenance purposes.

Under the air filter housing 15 a control and electrical room 72 for the gas turbine engine 5 can be arranged. The control and electrical room 72 can be arranged at two levels, to occupy less surface on the base plate 3.

The gas turbine engine 5 can be further provided with a ventilation duct 17, where—from cooling air is delivered to the gas turbine enclosure 16.

In some embodiment, the gas turbine engine 5 can be provided with an exhaust gas stack for discharging exhaust combustion gas in the environment. The exhaust gas stack (not shown) can be mounted on the same base plate 3 along with the gas turbine engine 5. In other embodiments, the exhaust gas stack can be mounted on a separate skid, which can be supported on the base plate 3 or, more particularly, on a separate base plate, not shown, which can further support a waste heat recovery exchanger, as well as other pieces of machinery, e.g. of an LNG system, thus forming a separate process module. An exhaust gas duct 18 connects the gas turbine engine 5 to the exhaust gas stack (not shown).

Figure 1:
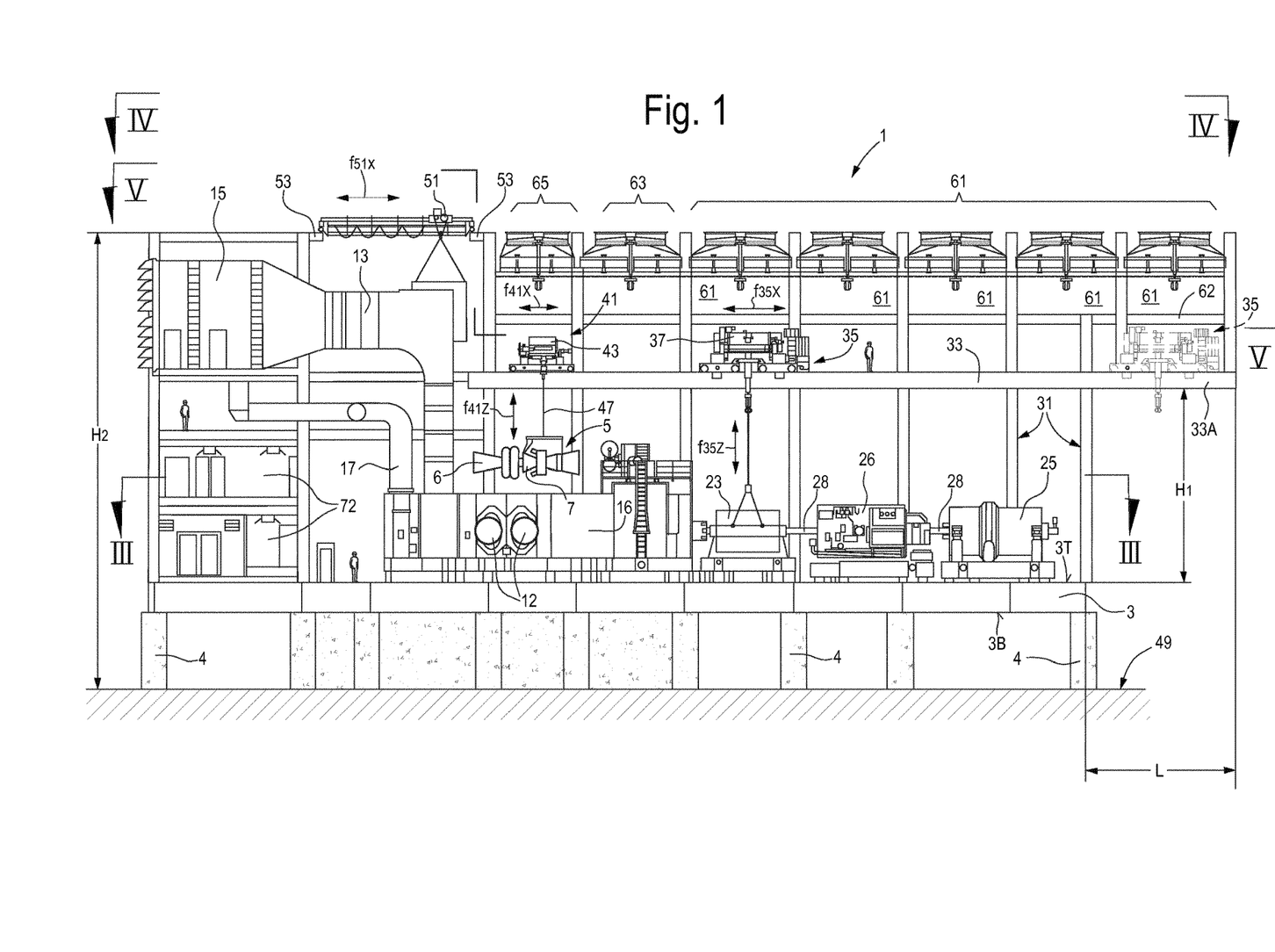
FIG. 1 illustrates a sectional view of a modularized gas turbine system according to line I-I of FIG. 3.
Figure 2:
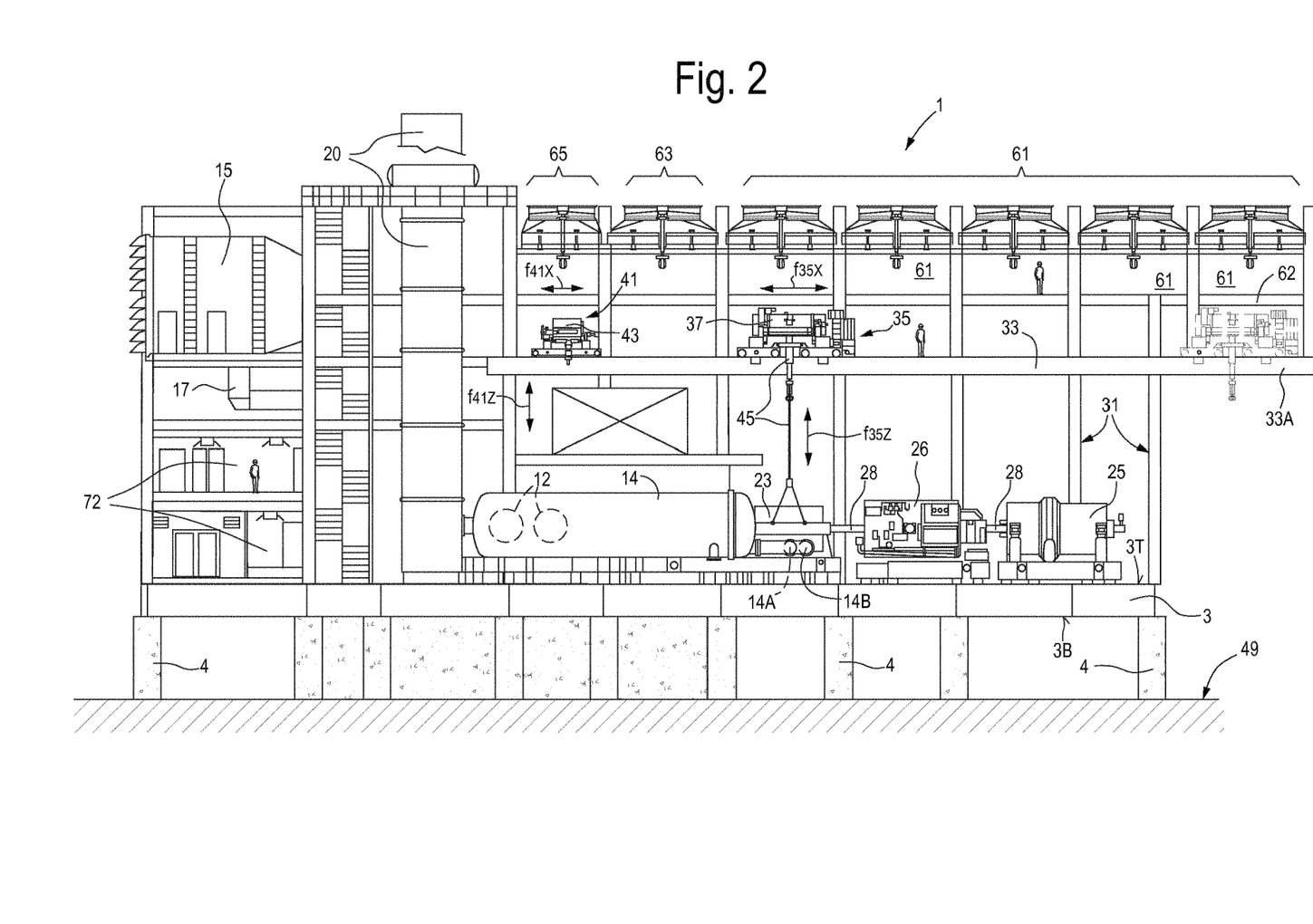
FIG. 2 illustrates a sectional view of the modularized gas turbine system of FIG. 1 according to line II-II of FIG. 3.

The gas turbine engine 5 is mechanically coupled to a load. In embodiments disclosed herein, the load comprises one or more compressors. In FIGS. 1 to 3 the load comprises a compressor train comprised of a first compressor 23 and a second compressor 25. A shaft line 28 extends from the gas turbine engine 5 to the last compressor 25. According to some embodiments, additional machines, other than turbomachines, can be arranged along the shaft line 28. For instance, between the first compressor 23 and the second compressor 25 an electric generator 26 can be arranged. In other embodiments, a reversible electric machine 26 can be used, which can operate as an electric motor and as an electric generator, selectively. The sequence of rotary machines 23, 25 and 26 forming the rotating load driven by the gas turbine engine 5 can be arranged different; e.g. the electric machine 26 can be arranged at the end of the shaft line, or between the gas turbine engine 5 and the first compressor 23.

The electric generator 26 can convert a surplus of mechanical power, generated by the gas turbine engine 5 and exceeding the power required to drive the compressors 23, 25 into electric power, which can be delivered to the electric power distribution grid, e.g. through a variable frequency driver, if needed. If a reversible electric machine 26 is used, the electric machine can be switched into a motor mode, if the power generated by the gas turbine engine 5 is not sufficient to drive the compressors 23, 25.

In some embodiments, the compressors 23, 25 can be refrigerant compressors, which compress a refrigerant gas of an LNG plant, used to cool and liquefy natural gas for transportation purposes, for instance. The LNG circuit, apart from the compressors, can be installed on a separate base plate, placed on a side of base plate 3 and not shown.

In further embodiments, a different number and kind of rotary machines can be mechanically coupled to the gas turbine engine 5, for instance only turbomachines, e.g. one, two or more compressors can be mechanically driven by the gas turbine engine 5.

In yet further embodiments, a helper different from an electric motor or a reversible electric machine can be drivingly coupled to the shaft line 28. For instance, a steam turbine can be used as a helper, if a source of steam is available in the plant, whereof the gas turbine engine 5 and the compressors 23, 25 form part.

If the various pieces of equipment arranged along the shaft line 28 are to be driven at different rotational speeds, one or more gear boxes or other speed manipulating devices can be located along the shaft line 28, such that different pieces of equipment can rotate at different speeds. Variable speed transmissions can be used, instead of gear boxes, if one or more of the rotating machines coupled to the shaft line 28 require to be operated at variable speeds.

According to some embodiments, one or both compressors 23, 25 can be BCL-series, barrel-type centrifugal compressors. A BCL compressor comprises a barrel with a horizontal axis and a front closure flange. The compressor rotor, including the impellers of the compressor, and the stationary components of the compressor, i.e. the diaphragms forming the diffusers and the return channels, can be extracted according to an extraction movement parallel to the rotation axis of the compressor, i.e. parallel to the axis of the barrel.

In other embodiments, one or both compressors 23, 25 can be MCL-series, horizontally split centrifugal compressors. In particular, the casing of an MCL compressor comprises two casing portions connectable to each other along a horizontal plane. The inner components of the compressor, i.e. the diaphragms and the rotor, can be removed by lifting the upper casing portion, without the need for moving the lower casing portion.

In yet further embodiments, a first one of said compressors 23, 25 can be an MCL-series, horizontally split centrifugal compressor and the other compressor can be a BCL-series centrifugal compressor. The BCL-series compressor can be arranged, in an embodiment, at the end of the shaft line 28, such that the barrel can be opened and the inner components of the compressor can be removed without dismantling the barrel.

If the compressor train comprises only one compressor, this latter can be either a horizontally split compressor, or a BCL compressor. In this manner, maintenance of the compressor is made easier. Indeed, the compressor casing of any one of said compressors of the compressor train can be opened, e.g. for maintenance or repairing purposes, without removing the compressor from the shaft line 28.

Figure 5:
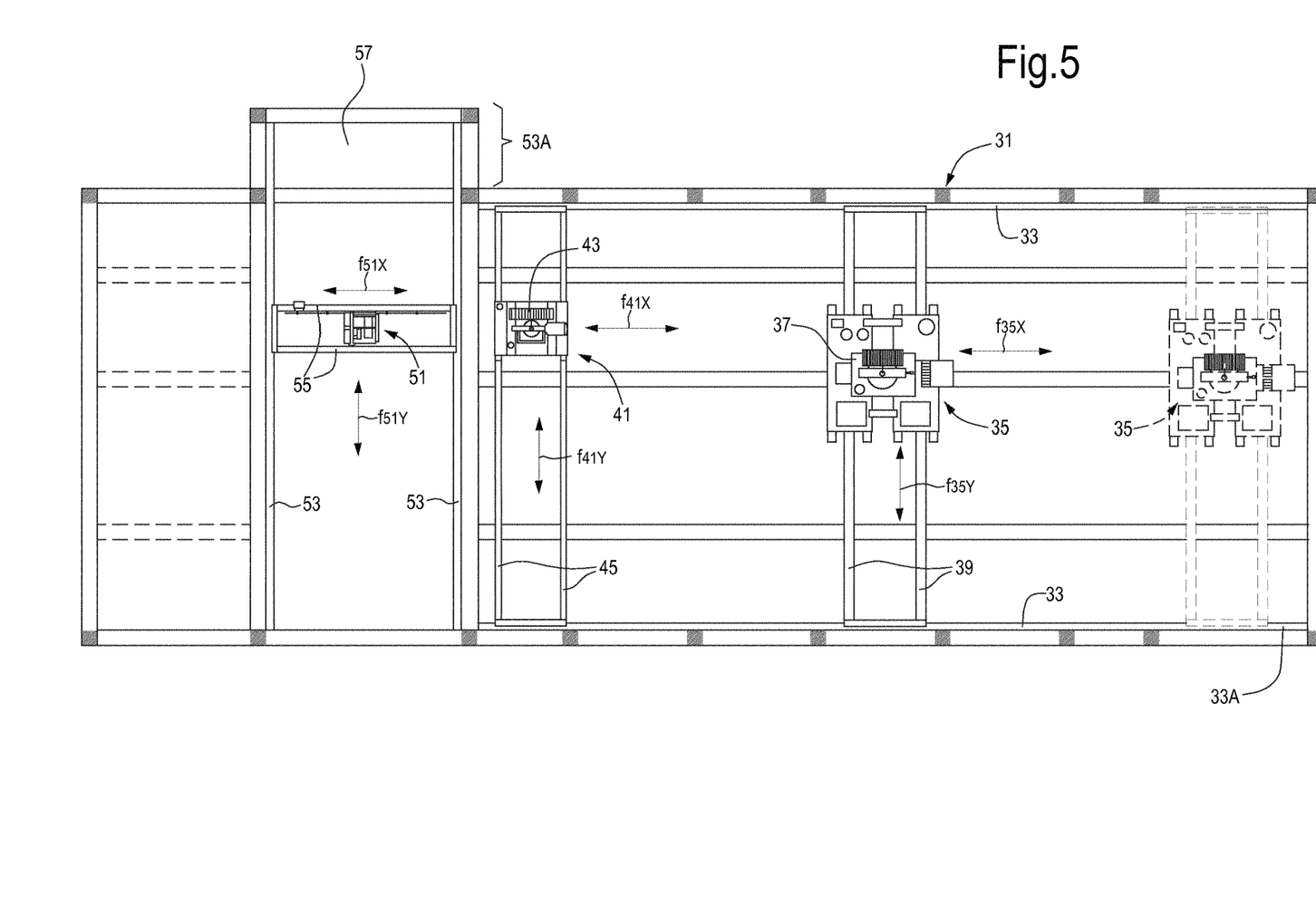
FIG. 5 schematically illustrates the crane bridge arrangement in a top plan view.

According to some embodiments, a supporting frame 31 extends from the top surface 3T of the base plate 3 up to a level higher than the air filter housing 15. At a first height H1 of the supporting frame 31, rails 33 for a first bridge crane 35 (i.e. overhead crane) are located, see in particular FIG. 5. The first bridge crane 35 is movable along rails 33 according to double arrow f35x in a direction substantially parallel to the rotation axis of the gas turbine engine 5 and of the shaft line 28. The first bridge crane 35 comprises a hoist 37, which is movable according to double arrow f35y, in a direction substantially orthogonal to the rotation axis of the gas turbine engine 5. The hoist 37 can be arranged on a trolley, which moves according to double arrow f35y along beams 39 of the bridge crane 35.

According to embodiments disclosed herein, a second bridge crane 41 can move along the same rails 33. The second bridge crane, or overhead crane, 41 can move according to double arrow f41x in a direction substantially parallel to the rotation axis of the gas turbine engine 5. A hoist 43 moves along beams 45 in a direction f41y, substantially orthogonal to the rotation axis of the gas turbine engine 5. The lifting capability of the second bridge crane 41 can be lower than the lifting capability of the first bridge crane 35.

As shown in FIGS. 1 and 2, the hoists operate ropes 47 with hooking members movable in a vertical direction according to double arrow f35z and f41z, respectively. The rails 33 extend beyond the footprint of the base plate 3, as can be seen in FIGS. 1 and 2. A portion 33A of the rails 33 cantileverly overhangs from the supporting frame 31 over a first lay down area 49. The length L of the overhanging portion 33A of the rails 33 is, in an embodiment, sufficient for al-lowing the first bridge crane 35 but not the second bridge crane 41 to move according to arrow f35x entirely outside the footprint of the base plate 3.

The first bridge crane 35 can be dimensioned and designed for handling heavier pieces of machinery such as the turbomachines 23, 25 and the electric machine 26 forming the load driven by the gas turbine engine 5. The second bridge crane 41 can be smaller than the first bridge crane 35 and can have a reduced lifting capability, since it can be used to lift and move components of the gas turbine engine 5, which are usually lighter than the machinery components of the load drivingly coupled to the gas turbine engine 5.

Since the first and second bridge cranes 35, 41 move along the same, common rails 33, areas which can be reached by the second bridge crane 41 cannot be reached by the first bridge crane 35, and vice-versa. For instance, the portion of rails 33 above the lay down area 49 can only be reached by the first bridge crane 35, while the area above the gas turbine engine 5 can be reached only by the second bridge crane 41. In order to move machine components from the area where the gas turbine engine 5 is arranged to the first lay down area 49 and vice-versa, the two bridge cranes 41, 35 can operate in combination, moving machine components from the area of action of one bridge crane towards the area of action of the other bride crane.

The two bridge cranes 35, 41 can also operate in parallel, each one in its own area of operation, so that a plurality of maintenance operations in different areas of the gas turbine system 1 can be performed simultaneously, thus reducing the overall time required and increasing the availability of the system.

Figure 4:
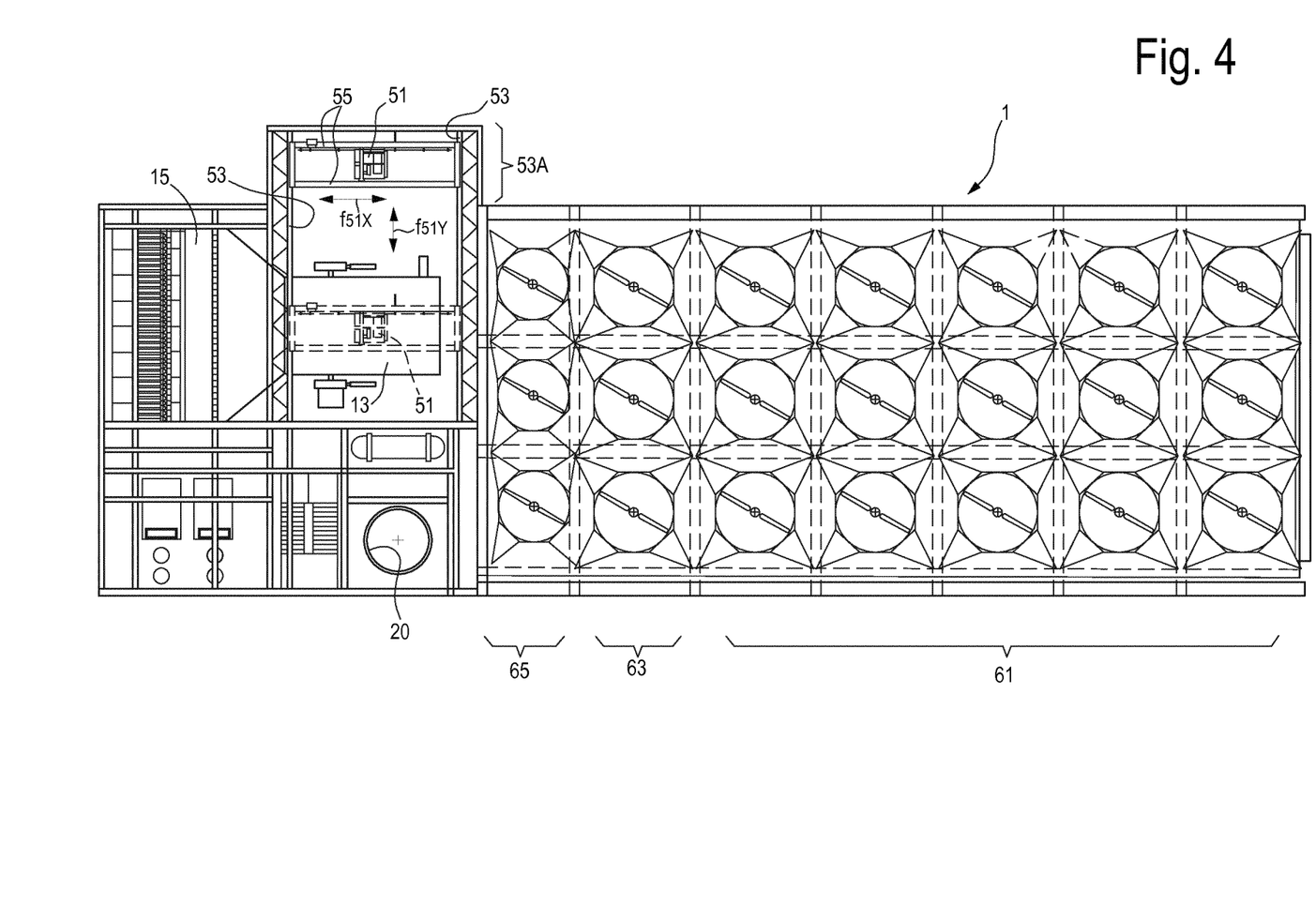
FIG. 4 illustrates a top plan view of the modularized gas turbine system according to line IV-IV of FIG. 1.

According to some embodiments, a third bridge crane 51 can be placed on rails 53, which are supported by the supporting frame 31 and extend substantially orthogonal to the rotation axis of the gas turbine engine 5 and to the shaft line 28. The third bridge crane 51 moves according to double arrow f51y in a direction parallel to the rails 53. The third bridge crane 51 further moves according to double arrow f51x along beams 55, which extend substantially parallel to the gas turbine engine 5. The rails 53 can overhang in a cantilever beyond the footprint of the base plate 3. A portion 53A of the rails 53 project from the supporting frame 31 above a second lay down area 57. As can best be appreciated from FIG. 4, for instance, the third bridge crane 51 can thus move above the clean air duct 13 and therefrom towards and above the second lay down area 57, and can be used for purposes of maintenance of the clean air duct 13 and of the air inlet plenum of the compressor section 6 of the gas turbine engine 5.

In some embodiments, the rails 53 are arranged at a height H2, which is higher than the height H1 where the rails 33 is located, along which the first and second bridge cranes 35, 41 run.

The third bridge crane 51 can operate in parallel with the first bridge crane 35 and/or with the second bridge crane 41, so that maintenance operations on the portion of the gas turbine system reached by the third bridge crane 51 can be carried out in parallel with maintenance interventions on the remaining part of the system, using the first and second bridge cranes 35, 41.

When an intercooler 14 is provided, for cooling partly compressed air between the low-pressure compressor section 6 and the high-pressure compressor section 7, a heat removal fluid circulates through inlet and outlet manifolds 14A, 14B in heat exchange relationship with the air flowing through the intercooler 14. The heat removal fluid is in turn cooled in secondary coolers 61, e.g. by means of heat exchange with ambient air. The secondary coolers 61 are advantageously arranged on a ceiling 62 of the supporting frame 31, at a height above the rails 33, such that the total footprint of the gas turbine system 1 is reduced. Further coolers 63 and 65 can be provided, for cooling synthetic lube oil and mineral lube oil used in the rotary machines of gas turbine system 1. These further coolers can be arranged adjacent the secondary coolers 61 at the same height above the level where the first and second bridge cranes 35, 41 are arranged and moved.

The intercooler 14 can be provided with a blow-out combustion air stack 20, through which partly compressed air is blown out in case of shut down of the gas turbine engine.

The modular gas turbine system 1 can be assembled, commissioned and tested at an assembling, commissioning and testing site, and then shipped at the final destination, without disassembling the major part of the mechanical, electrical and hydraulic connections, for instance the connections with the control and electrical room of the gas turbine engine, such that starting the system at the final site of use is made faster and easier, with less if no requirement for specialized staff. The modular gas turbine system 1 is of the type transportable. The presence of bridge cranes as integral components of the modularized gas turbine system 1 makes handling of the system components easier, both at the first installation as well as during maintenance interventions. The time required for maintenance is made shorter and thus availability of the entire system is improved.

If required, some of the components of the system can be disassembled prior to shipping, in particular if this becomes necessary or expedient for logistic purposes. For instance, the compressor(s) can be detached from the gas turbine engine. An interface along the shaft line between the gas turbine engine and the compressor(s) can be provided, which makes disconnection and connection of the compressor to the gas turbine engine easier. In some embodiments, a separable base plate portion can be provided, whereon the compressor(s) is/are mounted. The separable base plate portion can be assembled with the remaining part of the base plate at the time of assembling, commissioning and testing. Thereafter, the separable base plate portion can be separated from the remaining part of the base plate and shipped separately. Re-assembling will take place at the final site of use.

Many modifications and variants of the system can be envisaged. For instance, in simpler, embodiments, only two bridge cranes can be provided, rather than three. For example, only bridge cranes 35 and 41 can be provided. The rails 33 can be placed at a higher level and extended towards the air filter housing 15, so that e.g. bridge crane 41 can be moved above the clean air duct 13 to handle components of the clean air circuit. In other embodiments, only the first bridge crane 35 and the second bridge crane 51 can be provided, movable along orthogonally arranged, separate rails 33, 53.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter re-cited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A modular gas turbine system, comprising:
    a base plate;
    mounted on the base plate, a gas turbine engine having a rotation axis, a first air compressor section and a second air compressor section;
    at least one rotating load, mechanically coupled to the gas turbine engine and mounted on the base plate;
    a supporting frame extending above the base plate;
    an air intercooler fluidly coupled to the first air compressor section and second air compressor section, the air intercooler configured and arranged to cool partly compressed air from the first air compressor section in heat exchange relationship with a heat removal fluid;
    wherein a plurality of secondary coolers are arranged on the supporting frame above the base plate at a level above at least one of the gas turbine engine and the load, and are in fluid exchange relationship with the intercooler, the heat removal fluid being in heat exchange relationship with a cooling medium in the secondary coolers.

2. The modular gas turbine system of claim 1, wherein the secondary coolers are air coolers and the heat removal fluid is in heat exchange relationship with cooled ambient air in said secondary coolers.

3. The modular gas turbine system of claim 1, further comprising at least one lube oil cooler arranged on the supporting frame.

4. The modular gas turbine system of claim 3, wherein the at least one lube oil cooler is arranged at the same level as the secondary coolers.

5. The modular gas turbine system of claim 1, further comprising a first bridge crane movably supported on the supporting frame.

6. The modular gas turbine system of claim 1, further comprising a first bridge crane and a second bridge crane, both movable on the supporting frame.

7. The modular gas turbine system of claim 6, wherein the first bridge crane and the second bridge crane are movable on common rails mounted on the supporting frame.

8. The modular gas turbine system of claim 6, wherein at least one of the first bridge crane and second bridge crane is movable on rails extending substantially parallel to a rotation axis of the gas turbine engine.

9. The modular gas turbine system of claim 6, wherein the first bridge crane is movable along first rails extending substantially parallel to the rotation axis of the gas turbine engine and the second bridge crane is movable along second rails extending substantially orthogonal to the rotation axis of the gas turbine engine.

10. The modular gas turbine system of claim 6, wherein at least one of said first bridge crane and second bridge crane is movable on first rails extending substantially parallel to the rotation axis of the gas turbine engine and projecting horizontally beyond the footprint of the base plate up to a lay down area arranged on a side of the base plate.

11. The modular gas turbine system of claim 6, wherein the first bridge crane has a lifting capacity higher than the second bridge crane.

12. The modular gas turbine system of claim 6, further comprising a third bridge crane movably supported on the supporting frame.

13. The modular gas turbine system of claim 12, wherein the first bridge crane and the second bridge crane are movably arranged on first rails supported by the supporting frame, the third bridge crane is movably arranged on second rails supported by the supporting frame, and the second rails are arranged above the first rails.

14. The modular gas turbine system of claim 1, wherein the rotating load comprises at least one gas compressor.

15. The modular gas turbine system of claim 1, wherein the modular gas turbine system is configured to be transportable.

* * * * *